United States Patent [19]
Walles

[11] 3,834,371
[45] Sept. 10, 1974

[54] FOLDABLE RACK FOR SUSPENDING COOKING PANS OVER A CAMPFIRE

[76] Inventor: Wilhelm E. Walles, 3606 Chestnuthill Dr., Midland, Mich. 48640

[22] Filed: Jan. 10, 1972

[21] Appl. No.: 216,391

[52] U.S. Cl. .................................................. 126/30
[51] Int. Cl. ........ A47j 37/00, F24b 3/00, F24c 1/16
[58] Field of Search .... 126/30; 211/119.01, 119.15; 248/322, 323, 327, 339; 59/93

[56] References Cited
UNITED STATES PATENTS

| | | | |
|---|---|---|---|
| 690,150 | 12/1901 | Imman | 126/30 X |
| 699,189 | 5/1902 | Kerr | 248/327 |
| 832,163 | 10/1906 | Ruger et al. | 126/30 X |
| 879,390 | 2/1908 | Lash et al. | 211/119.15 |
| 1,180,941 | 4/1916 | Phelps | 220/95 |
| 2,042,406 | 5/1936 | Kuehn et al. | 126/30 X |
| 2,466,496 | 4/1949 | Smith | 126/30 X |
| 2,521,037 | 9/1950 | Brinton | 248/339 |
| 3,011,818 | 12/1961 | Matthiessen | 292/288 |

FOREIGN PATENTS OR APPLICATIONS

| | | | |
|---|---|---|---|
| 7,073 | 3/1898 | Great Britain | 126/30 |
| 533,974 | 3/1922 | France | 126/29 |

*Primary Examiner*—Carroll B. Dority, Jr.
*Assistant Examiner*—Harold Joyce

[57] ABSTRACT

The invention is a one-piece lightweight foldable rack for suspending cooking pans over a campfire.

The one-piece rack consists of a center metal chain supported by 2 vertical sticks or poles and kept over the fire by four rope supports, secured by pegs and has two adjustable metal chains with hooks to hold the pans. The chain for holding a pan has at one end a hook for a cooking pan and at its other end a hook for adjusting chain length, including an eye through which the other end of the chain passes.

1 Claim, 3 Drawing Figures

3,834,371

FOLDABLE RACK FOR SUSPENDING COOKING PANS OVER A CAMPFIRE

DESCRIPTION

PROBLEM — PREVIOUS ART

In the preparation of warm food many millions of people are faced daily with the problem of heating cooking pans over a fire.

In permanent houses many practical kitchen utensils are used. However, for nomadic people, or for modern-day campers such as Boy Scouts, the overriding requirement is light weight and simplicity.

The problem of nomadic cooking over an open fire requires a solution which simultaneously satisfies a number of requirements:

a. Quick installation and removal of the supporting rack, preferably while the fire is burning.

b. Easy placement over — and removal of pans from the fire.

c. Vertical and horizontal adjustment of pans over the fire to maintain the proper heatflow to the pans, which varies while the cooking proceeds.

d. Accessibility of the fire to permit addition of twiggs and branches.

e. Safety. No tipping of the pans, no burning of the fingers during cooking, no burning of the food or boiling over.

Among the inventive solutions which have become known to man on this problem are:

1. Assemblies of stones, when available. This is the most primitive. The various known configurations of loose stones to support pans rate good on *a* and *b*, fair on *c* and *e*, and poor on *d*.

2. Holes in the ground. Rating good on *a* and *b*, fair on *c*, poor on *d* and *e*.

3. Metal grate (on stones or on the ground over a hole). Rating good on *a*, *b* and *e*, poor on *c* and *d*.

4. Pan on slanted stick supported by one vertically placed forked branch. Good for 1 pan only. Rating good on *a* and *d*, poor on *b*, *c* and *e*.

5. Pans on horizontal stick supported by 2 vertical forked branches. Rating good on *a* and *d*, poor on *b*, *c* and *e*.

6. Tripod with pan on chain. Good for 1 pan only. Rating good on *a*, *b* and *d*, poor on *c* and *e*.

PRESENT INVENTION — DESCRIPTION

It is the object of the present invention to provide a solution which rates good on all 5 requirements listed above.

Figure 1:
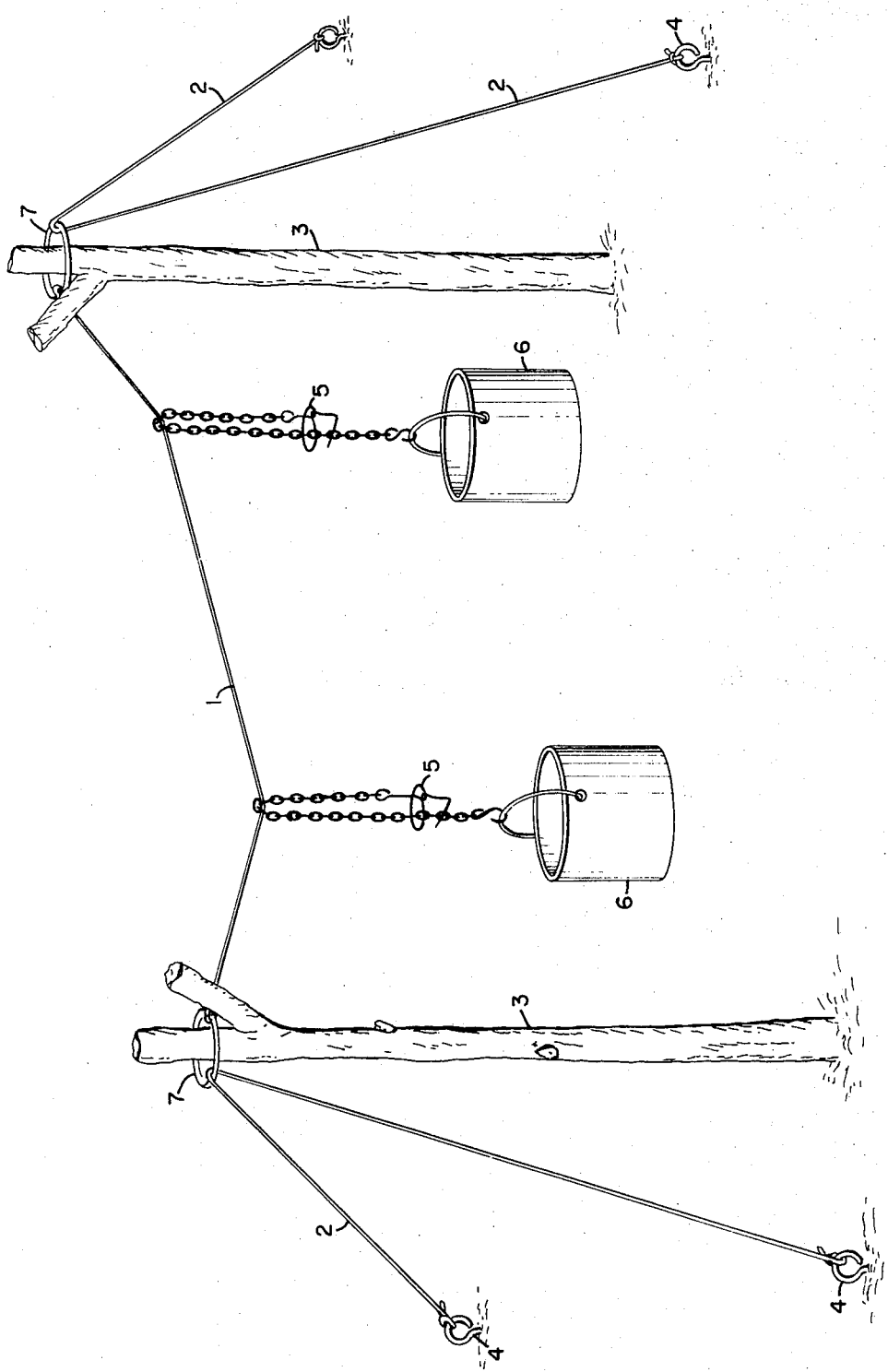
FIG. 1 is a perspective view of the foldable rack being used for suspending 2 cooking pans over a fire.

When folded and rolled up it is very small in dimensions and light in weight. The rack is demonstrated in FIG. 1.

A center chain 1 of about 3 feet length is at both ends attached to rings 7, which fit loosely over vertical sticks or poles about 2 feet long. Attached to each of rings 7 are 2 metal chains 2 with a length of about 3 feet. The chains 2 are each secured in the ground by a peg 4. The peg can conveniently be a 10 inch long metal pin with an eye. The vertical sticks 3 usually have enough outside irregularities, such as knobs or branches, to hold the rings up. The sticks or poles 3 can be longer than about 3 feet, as long as there is a branch or fork at the 2 foot level.

The cooking pans 6 can be attached to the horizontal chain 1 via metal chain 5 with hooks.

Figure 2:
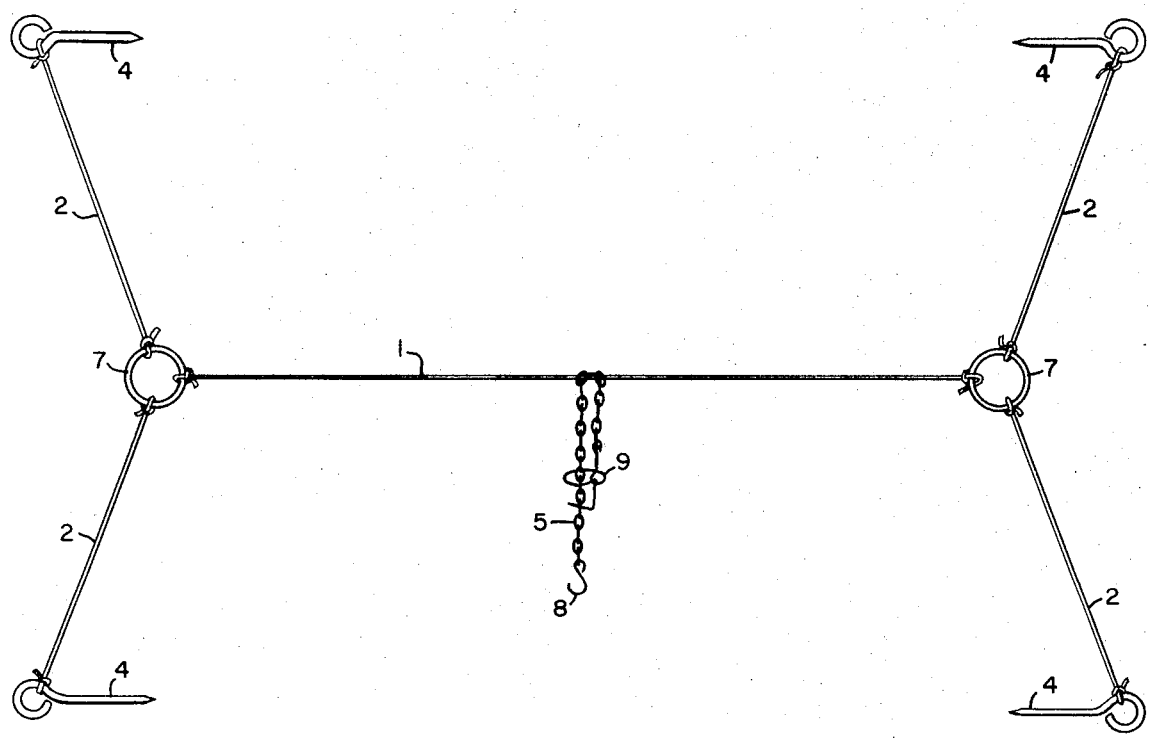
FIG. 2 is the whole one-piece foldable rack spread out on a flat surface.

In FIG. 2 the whole one-piece foldable rack is shown spread out prior to rolling up. Although its parts can be detached, there is no need to. The chain 5 has at one end hook 8 for holding the hinge of pan 6. Chain 5 is folded over chain 1 to make its effective length adjustable.

Figure 3:
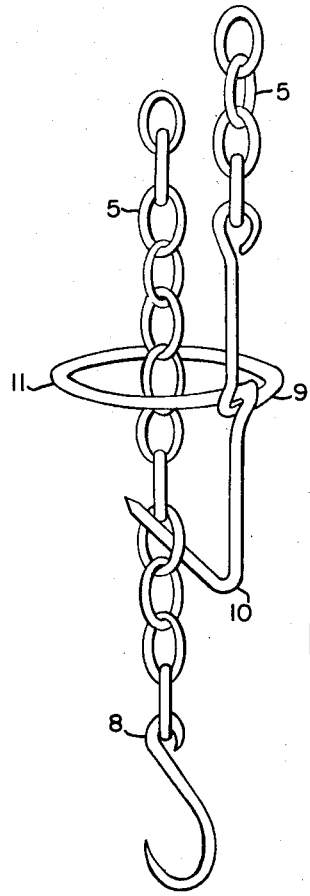
FIG. 3 is a detail of the chain with composite hook and eye.

In FIG. 3 is shown the other end of chain 5 having a composite hook and eye 9. Composite part 9 has a hook 10 which can engage one of the eyelets of chain 5 and thereby adjust the height of pan 6 above the ground. Composite part 9 also has an eye 11 through which the other end of the chain fits loosely. Eye 11 functions to greatly facilitate the variable engagement position of hook 10 and prevents chain 5 from slipping off chain 1 too easily. This prevents chain 5 from falling into the fire, particularly when no cooking pan is attached and accidental shaking occurs.

Two chains 5 permit suspension of 2 cooking pans, although 1, 3 or 4 chains can be used. Horizontal adjustment of the suspended cooking pans is achieved by sliding vertical chain 5 along horizontal chain 1. As these vertical chains 5 are adjustably attached to horizontal chain 1, the whole cooking rack is one-piece for practical purposes, and can be rolled up as such. The rolled-up state is very compact.

MODIFICATIONS

The description above pertains to the most practical, preferred form of the invention, selected after testing various modifications.

An alternate form has the metal chains 1 and 5 replaced by rope, which is lighter than the preferred form, but the rope can be burned easily.

Another form has chains 2 replaced by rope.

Similarly, metal rings 7 can be omitted, or replaced by chain rings, making the rack more difficult to attach to the sticks.

For a de-luxe model, poles 3 can be made of aluminum or other suitable metal, or even attached to and made part of the cooking rack without essentially departing from the present invention.

Two 3-feet ropes attached to a ring can conveniently be replaced by one 6-feet rope, tied around the ring at its halfway point.

Also, the sizes given here are very practical and preferred, although some enlargement or reduction in size is possible without departing from the present invention.

Other simple modifications, such as using snap-on hooks, or making the 4 pegs detachable, can be made and are well-known to experienced campers.

I claim:

1. A foldable rack for suspending one or more cooking pans over a fire comprising: a center line adapted to be supported between two vertical supports, one or more suspension lines folded over said center line, each suspension line having at one end means for attaching it to a cooking pan, each suspension line having a hook attached to its other end including an eye intermediate the ends of said hook, the end of the suspension line opposite said hook passing through said eye and engaged by said hook.

* * * * *